(12) United States Patent
Armstrong et al.

(10) Patent No.: US 10,399,647 B2
(45) Date of Patent: Sep. 3, 2019

(54) MECHANISM AND ARRANGEMENT FOR STATIC AND DYNAMIC ADJUSTMENT OF SUBMERSIBLE PUMPS ASSOCIATED WITH A FLOATING PLATFORM

(71) Applicant: Weir Canada, Inc., Mississauga (CA)

(72) Inventors: Stuart M. Armstrong, Burlington (CA); Gina Succi, Ancaster (CA)

(73) Assignee: WEIR CANADA, INC., Mississauga, Ontario (CA)

( * ) Notice: Subject to any disclaimer, the term of this patent is extended or adjusted under 35 U.S.C. 154(b) by 268 days.

(21) Appl. No.: 15/437,600

(22) Filed: Feb. 21, 2017

(65) Prior Publication Data

US 2017/0158293 A1 Jun. 8, 2017

Related U.S. Application Data

(63) Continuation of application No. 13/816,066, filed as application No. PCT/IB2011/002561 on Aug. 9, 2011, now abandoned.

(60) Provisional application No. 61/372,073, filed on Aug. 9, 2010, provisional application No. 61/372,070, filed on Aug. 9, 2010.

(51) Int. Cl.
| | |
|---|---|
| *B63B 35/44* | (2006.01) |
| *F04B 39/00* | (2006.01) |
| *B63B 3/48* | (2006.01) |
| *B63B 35/28* | (2006.01) |
| *F16L 3/18* | (2006.01) |
| *F04B 23/04* | (2006.01) |

(52) U.S. Cl.
CPC .............. *B63B 35/44* (2013.01); *B63B 3/48* (2013.01); *B63B 35/28* (2013.01); *F04B 39/00* (2013.01); *F16L 3/18* (2013.01); *F04B 23/04* (2013.01)

(58) Field of Classification Search
CPC . B63B 35/28; B63B 35/44; B63B 3/48; F16L 3/18
See application file for complete search history.

(56) References Cited

U.S. PATENT DOCUMENTS

| | | | |
|---|---|---|---|
| 3,253,357 A | 5/1966 | Allard | |
| 3,543,422 A | 12/1970 | Plutchak | |
| 3,583,445 A | 6/1971 | Harbonn et al. | |
| 4,448,568 A | 5/1984 | Gentry et al. | |

(Continued)

FOREIGN PATENT DOCUMENTS

| | | |
|---|---|---|
| GB | 1581326 | 12/1980 |
| NL | 7611570 | 4/1978 |

OTHER PUBLICATIONS

PCT International Application No. PCT/IB2011/002561 International Search Report dated Mar. 14, 2012.

(Continued)

*Primary Examiner* — Sang K Kim
(74) *Attorney, Agent, or Firm* — Perry + Currier Inc.

(57) ABSTRACT

In an amphibious or flotational device for supporting one or more submersible pumps, the flotational device is structurally configured to provide the means for enabling both static and dynamic positioning of the submersible pumps at selected depths below the flotational device, and to provide means for improved pay-out and storage of flexible piping that enables improved dynamic positioning of the submersible pumps.

18 Claims, 13 Drawing Sheets

(56) References Cited

U.S. PATENT DOCUMENTS

| 6,276,456 B1* | 8/2001 | Head .................... E21B 17/015 |
| | | 166/350 |
| 2005/0214143 A1 | 9/2005 | Stirling et al. |
| 2009/0116984 A1 | 5/2009 | Plutchak |

OTHER PUBLICATIONS

Non-Final Rejection dated Aug. 14, 2015 for Related U.S. Appl. No. 13/816,066.
PCT International Application No. PCT/IB2011/002561 International Preliminary Report on Patentability dated Oct. 4, 2012.
Canadian Dewatering Dragflow Dredge; Mar. 2011.
CIPO, Examination Report, dated Feb. 28, 2018, re Canadian Patent Application No. 2850934.
Dragflow Video Screenshot uploaded Mar. 8, 2010.
PCT International Application No. PCT/IB2011/002561 Written Opinion of the International Search Authority dated Mar. 14, 2012.
Examination Report dated May 30, 2017 for Canadian Patent Application No. 2850934.

* cited by examiner

MECHANISM AND ARRANGEMENT FOR STATIC AND DYNAMIC ADJUSTMENT OF SUBMERSIBLE PUMPS ASSOCIATED WITH A FLOATING PLATFORM

TECHNICAL FIELD

This disclosure relates to floating platform assemblies structured for supporting one or more submersible pumps, and specifically relates to mechanisms and arrangements for enabling the lowering of such submersible pumps to selected depths below the floating platform employing static and dynamic means.

STATEMENT OF THE RELATED ART

Amphibious or flotation apparatus for supporting various equipment in or over a body of water have been known and used for several decades. Most notably, amphibious platforms have been used to support dredging apparatus in or over bodies of water to mine and/or dredge material from the bottom of a body of water. Examples of such devices are described in U.S. Pat. Nos. 4,680,879 and 6,755,701.

The use of flotation devices for supporting pumps used in bodies of water to pump fluids and solids from within the body of water, or at the bottom of the body of water, are also known. Examples of such devices are described in, for example, U.S. Pat. Nos. 5,186,610; 4,553,902 and 3,617, 146. Flotation devices typically described in these patents comprise a small vehicle or flotation support that enables the pump to be buoyantly maintained on a body of water while water is processed through and by the pump.

Flotation devices have also been developed to support submersible pumps in which the arrangement allows the submersible pump to be vertically lowered from the flotation device to or near the bottom of the body of water, and then raised again to the flotation device, Such systems are limited in the depth to which the submersible pump can be lowered due to the structure of the flotation device, the configuration of the submersible pump and the means used for lowering the pump to the bottom of the body of water.

In certain applications, such as consolidation or management of tailings ponds, it is necessary to pump the tailings material from the bottom of the pond, which may be accomplished using a flotation device with associated submersible pumps. In such applications, the tailings or slurries at the bottom of the pond are stratified and represent varying types of materials (e.g., thin fine tailings and mature fine tailings (MFT)). It may be desirable or necessary in some applications, therefore, to lower the pump to a particular depth in order to selectively pump particular tailings or slurries that reside at a given level or stratification at the bottom of the pond.

Heretofore, the ability to dynamically adjust the depth to which submersible pumps may be lowered or positioned in a body of water from a flotation platform has been problematic. The depth to which the pump is lowered is typically adjusted, in conventional systems, by adding one or more lengths of metal pipe to the pump discharge conduits, thereby enabling the lowering of the pump to a predetermined level. However, the determination of the depth to which the pump is to be lowered, then manipulating the pump to the flotation device and taking the pump off-line to add sections of piping to achieve the required lowering depth, all comprise a time-consuming and costly endeavor, particularly in terms of the limited space that is available on flotation platforms for storing the addition piping inventory and in the significant amount of labor required to modify the pump.

It would be advantageous, therefore, to provide a system for selective depth positioning of submersible pumps by use of static and dynamic apparatus and arrangements. It would also be advantageous to provide a flotation barge for supporting one or more submersible pumps that facilitates positioning the pumps at locations within the body of water, and at variable depths within the body of water, to improve efficiencies in the pumping operation.

SUMMARY OF THE DISCLOSURE

In an amphibious or flotational device for supporting one or more submersible pumps, the flotational device is structurally configured to provide the means for enabling both static and dynamic positioning of the submersible pumps at selected depths below the flotational device, and to provide means for improved pay-out and storage of flexible piping that improves the dynamic positioning of the submersible pumps.

In a first aspect of the disclosure, a flotation platform, also referred to herein as a flotation barge, is structured for supporting at least one submersible pump and for lowering the pump into a body of fluid, typically comprising water containing solids, The flotation platform may accommodate multiple numbers of submersible pumps, each submersible pump being positioned and secured to the flotation platform in a manner that enables the submersible pump to be selectively positioned at variable depths below the flotation barge.

In another aspect of the disclosure, the selective depth to which the submersible pump may be lowered is accomplished by providing dynamic positioning elements that enable the pump to be lowered to a variable and selected depth.

In another aspect of the disclosure, the selective depth to which the submersible pump may be lowered is accomplished by providing static positioning elements that enable the dynamic positioning range of the pump to be increased.

In an aspect of the disclosure, the dynamic and static positioning elements may be used in tandem to achieve a selected dynamic positioning range of the pump. The dynamic positioning elements may also be used singly for positioning the submersible pump to a selected depth.

In another aspect of the disclosure, the adjustment of the depth to which each pump is lowered may be accomplished from a position that is remote from the flotation platform, thereby enabling operation of the flotation platform in inclement weather conditions and at reduced manpower.

In a second aspect of the disclosure, the dynamic positioning elements associated with the flotation platform are structured to enable more advantageous dynamic positioning of the submersible pumps, Specifically, the dynamic positioning elements include at least one flexible conduit or hose that is operatively connected to the discharge of a submersible pump. The dynamic positioning elements also include a take-up mechanism that operates to manage the taking up and feeding out of the flexible conduit in a mariner that assures that the flexible conduit will not kink or become entangled with the pump or other matter in the body of fluid. The take-up mechanism allows the flotation platform and submersible pumps to be operated in inclement conditions (e.g., winter) and, most advantageously, enables remote operation and positioning of the pumps to selected depths.

In a third aspect of the disclosure, methods are disclosed for dynamically lowering a submersible pump to a selected depth below a flotation barge to which the submersible pump is secured employing dynamic positioning elements in accordance with the disclosure herein.

BRIEF DESCRIPTION OF THE SEVERAL VIEWS OF THE DRAWINGS

Notwithstanding any other forms which may fall within the scope of the methods and apparatus as set forth in the disclosure, specific embodiments will now be described, by way of example, and with reference to the accompanying drawings in which.

DETAILED DESCRIPTION OF SPECIFIC EMBODIMENTS

Figure 1:
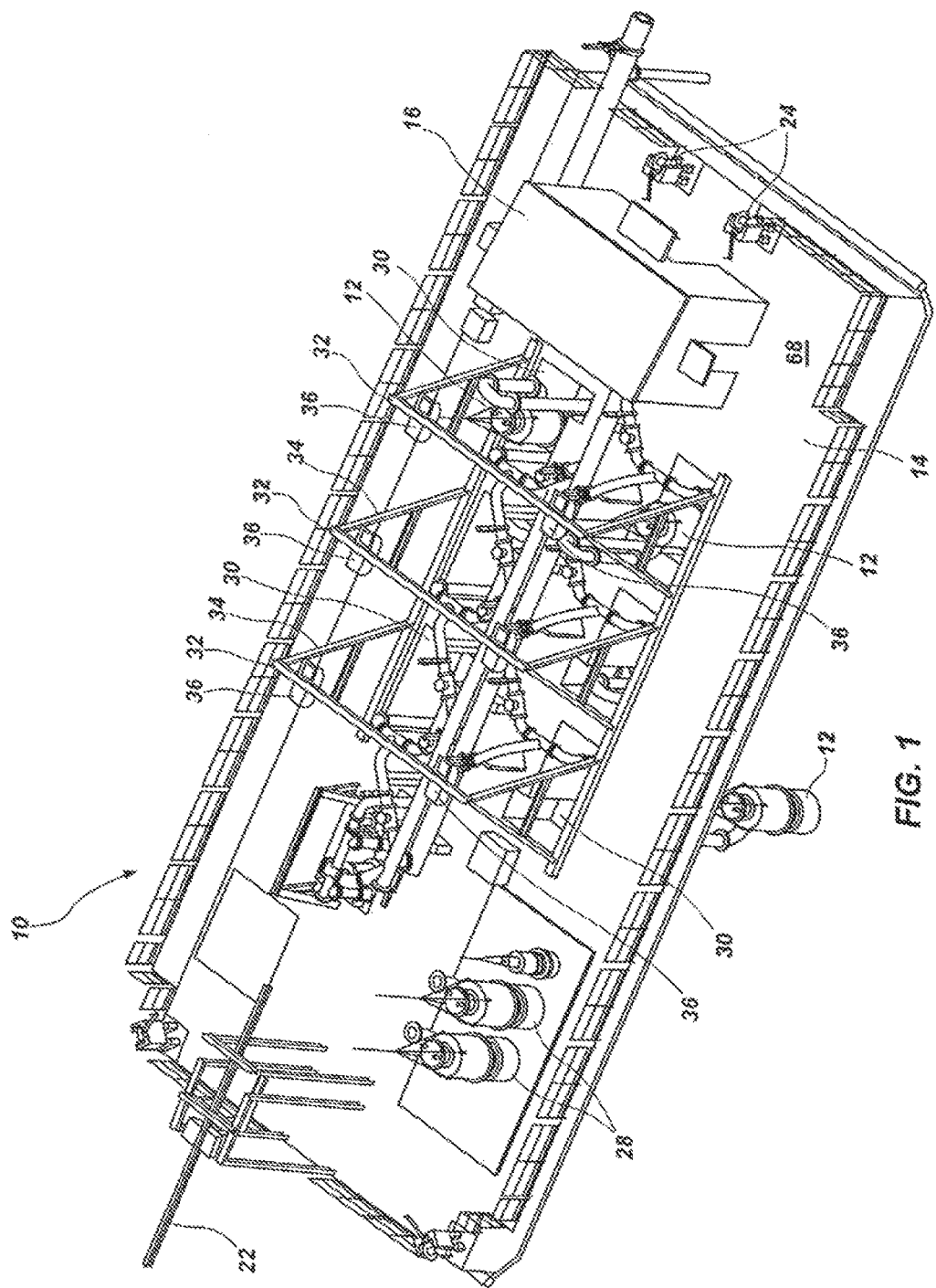
FIG. 1 is an isometric view of a flotation barge in accordance with one embodiment of the present disclosure.
Figure 2:
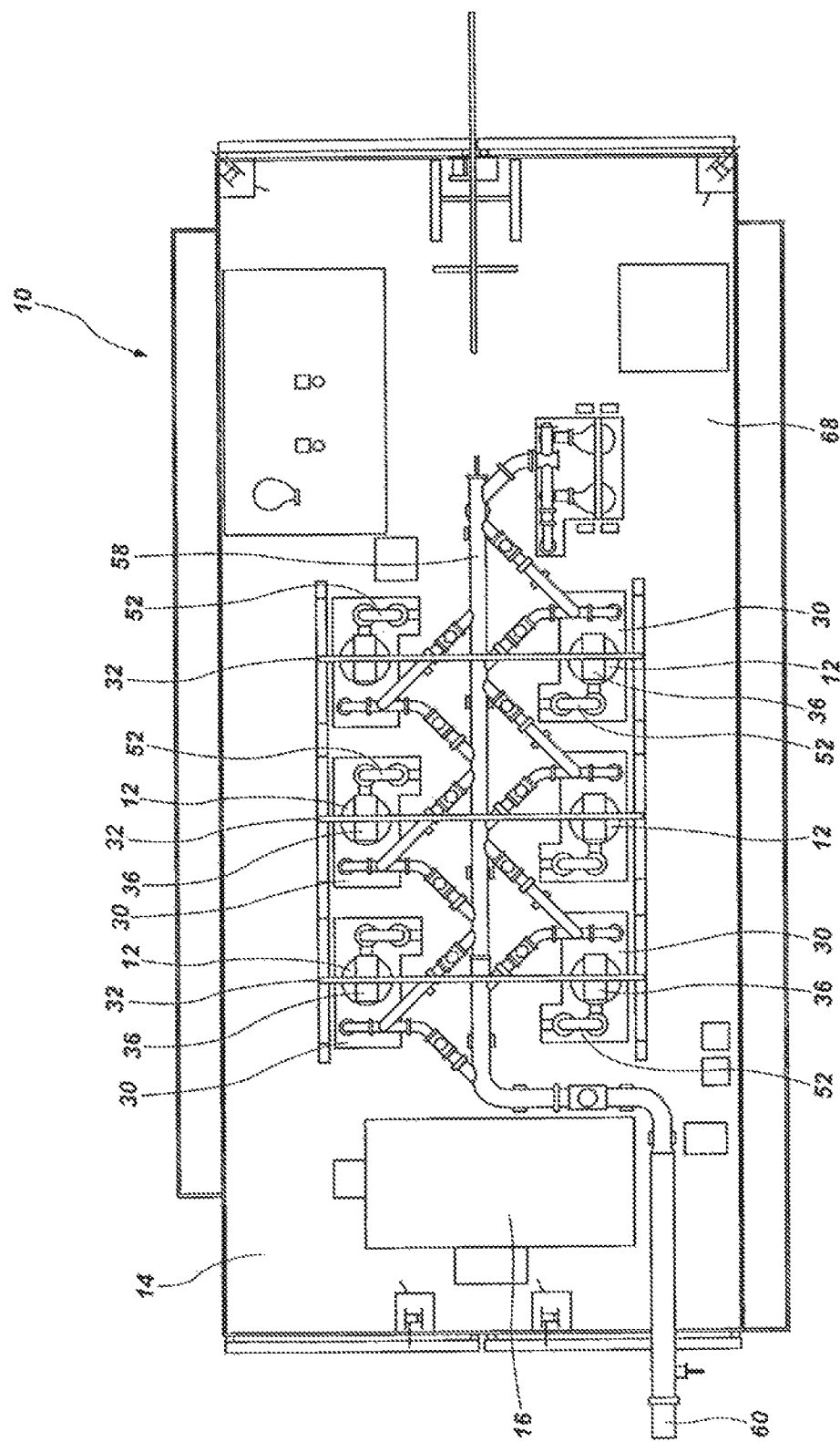
FIG. 2 is a plan view of the flotation barge shown in FIG. 1.

FIGS. 1-5 illustrate one embodiment of a flotation barge 10 that is structured to support one or more operable submersible pumps 12 in accordance with the present disclosure. The flotation barge 10 generally comprises a platform 14 which may support operational features, such as a control room 16 in which the electronic operating elements of the flotation barge 10 are housed, including, for example, computer systems and controls. The flotation barge 10 may be structured with a roof or housing 18, shown in FIG. 4, which encloses at least part of the platform 14, especially over the location of the pumps. The housing 18 may be structured with a hoist or crane system 20 for effecting movement of the submersible pumps 12 into and out of position for operation in a body of water. The flotation barge 10 may further be structured with a crane system 22 for servicing the flotation barge 10, and may include one or more winches 24 for maneuvering the platform 14.

The flotation barge 10 is structured to support at least one, or a plurality of, submersible pumps 12 in a manner that enables the submersible pumps 12 to be raised and lowered to a selected depth below the flotation barge 10, and to be hoisted to a level at or above the platform 14 for storage out of the water. In the particular embodiment of the flotation barge 10 illustrated in FIGS. 1-5, a grouping of six submersible pumps 12 is arranged centrally to the platform 14. It is noted that the centrally grouped submersible pumps 12 are those which are positioned and maintained for active service (although all pumps may not be in service at the same time). The platform 14 may be structured to accommodate a number of off-service pumps 28 that may be ready, or may be made ready, for service as needed.

In can generally be seen in FIGS. 1-5 that the central area of the flotation barge 10 is structured with openings 30 extending through the platform 14 through which a submersible pump 12 is movable from a raised position, at or near the bottom of the platform 14, to a lowered position where the pump is positioned in a body of fluid at a selected depth. The vertical movement of the submersible pumps 12 between a raised and lowered position is effected by a dynamic suspension system 32 from which each submersible pump 12 is suspended. The dynamic suspension system generally includes a pump support member 34, which is shown in FIGS. 1-5 as an A-frame structure; however, other pump support members 34 may include, for example, a jib hoist or other suitably structured devices.

Figure 4:
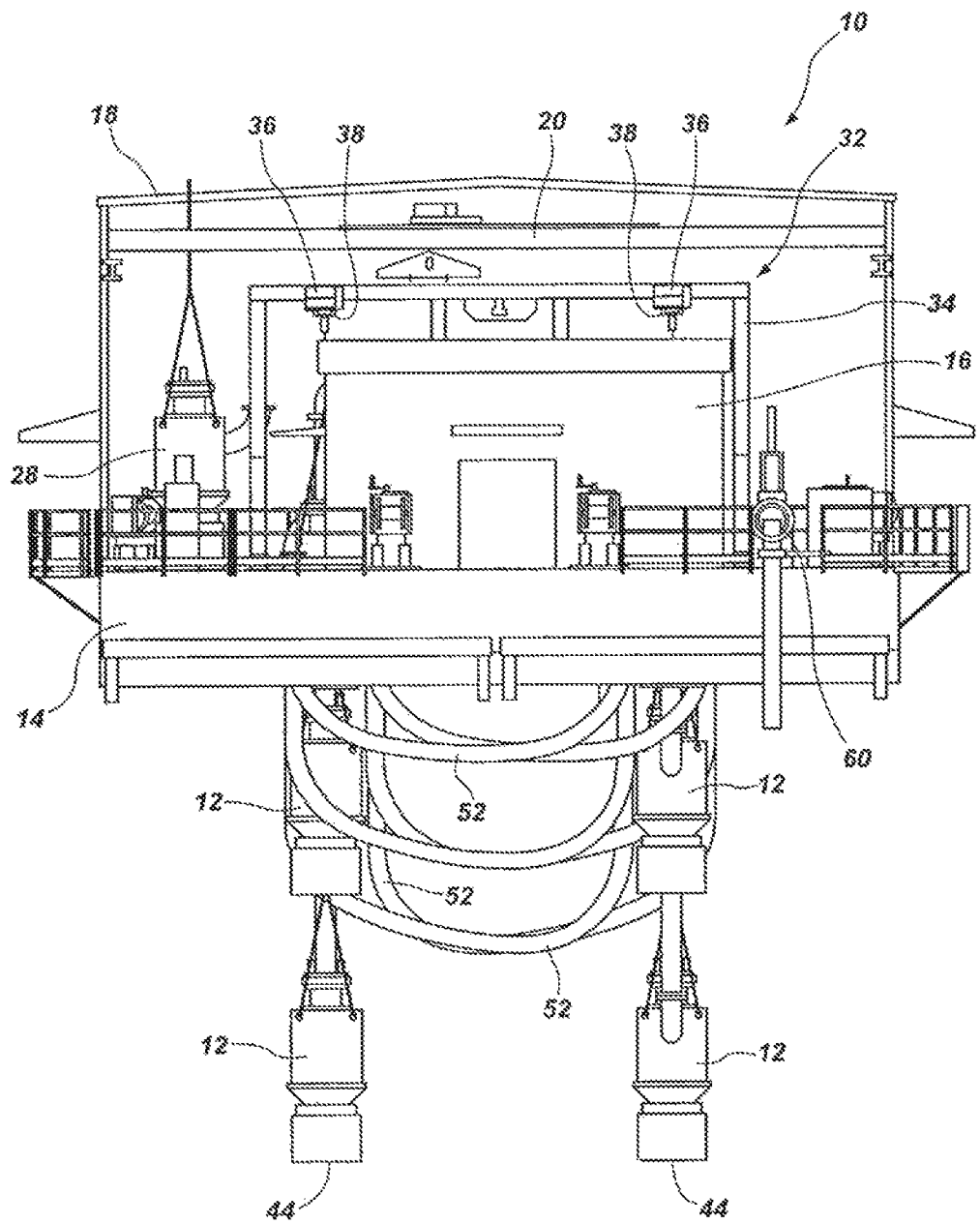
FIG. 4 is an end view in elevation of the flotation barge as illustrated in FIG. 3, rotated 90 degrees clockwise.
Figure 6:
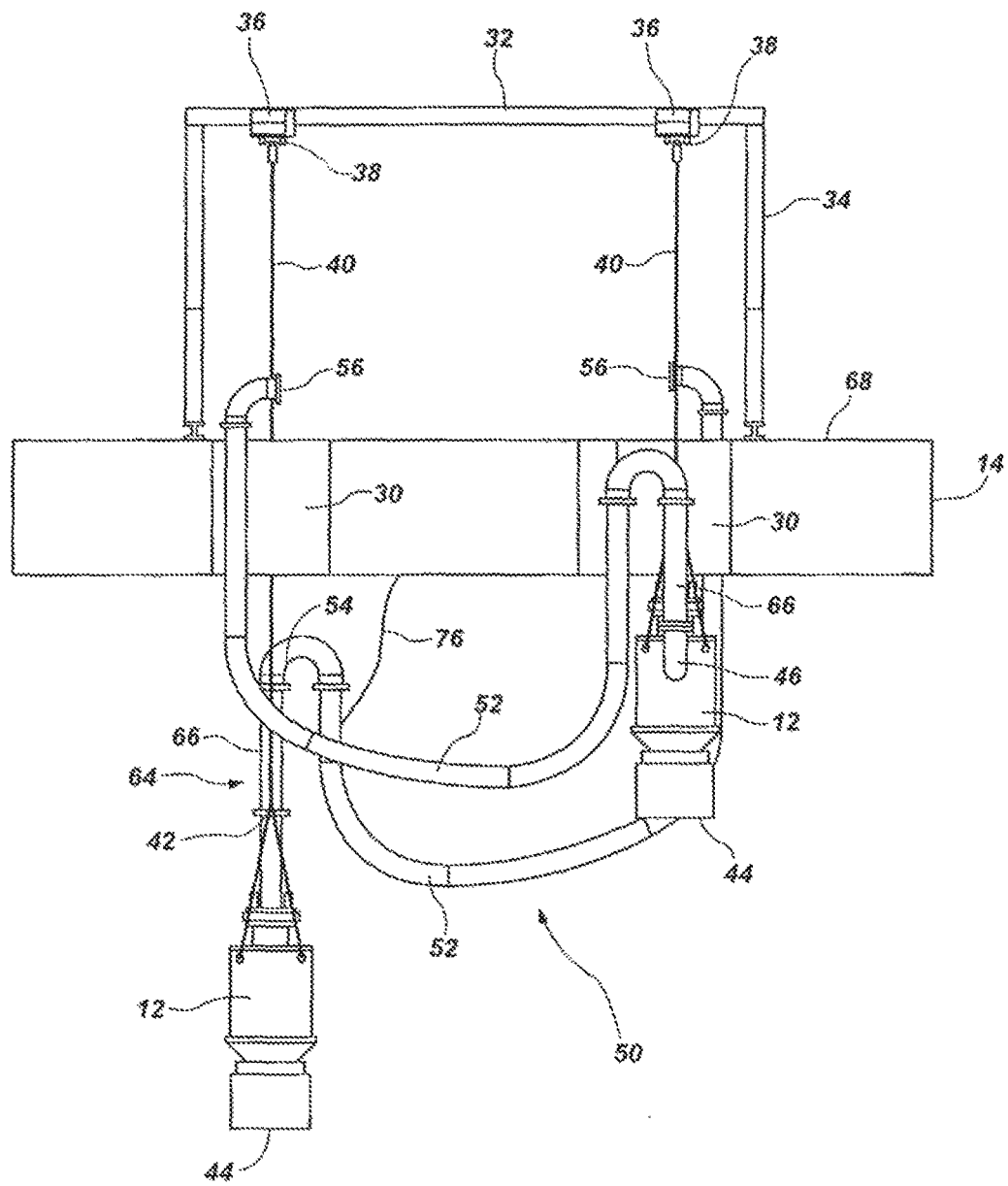
FIG. 6 is a side view in elevation of one portion of the flotation barge illustrating two submersible pumps in relative vertical and horizontal arrangement.

Each submersible pump 12 is suspended from an electrically operated hoist device 36, such as a 15 tonne hoist, that is rigidly mounted to the pump support member 34. Each hoist device 36 is driven by a suitably sized and powered motor that is powered from a variable frequency drive (VFD). In order to determine the vertical position of the submersible pump 12, each motor is equipped with a shaft mounted resolver 38 (FIGS. 4 and 6). The resolver 38 provides a precise feedback of motor operation. Since motor operation directly correlates to the pay-out or take-up of the hoist device 36, an algorithm is employed to positively establish the position of the submersible pump 12 for any point of travel, as explained more fully below. In addition to precise positioning of the pump 12 to achieve a selected depth, the VFD can be used to control the speed of pump movement, and facilitates the most desirable motion in terms of start and stop ramps.

In accordance with a first aspect of the disclosure, the submersible pumps 12 may be lowered to a selected depth below the flotation barge 10 by means of static positioning elements and/or dynamic positioning means. The ability to precisely position the submersible pump at a selected level is particularly advantageous, for example, in the management of tailings from various mining operations. In such mill tailings, the bottom of the pond becomes stratified with materials of different particulate quality or content, and it may be desirable to position the submersible pump to suction a particular stratum of the mill tailings. Therefore, the ability to achieve a dynamic range in which the pump may operate, and then to selectively modify the depth to which the pump may be lowered within that dynamic range, is advantageous over prior systems.

Figure 7:
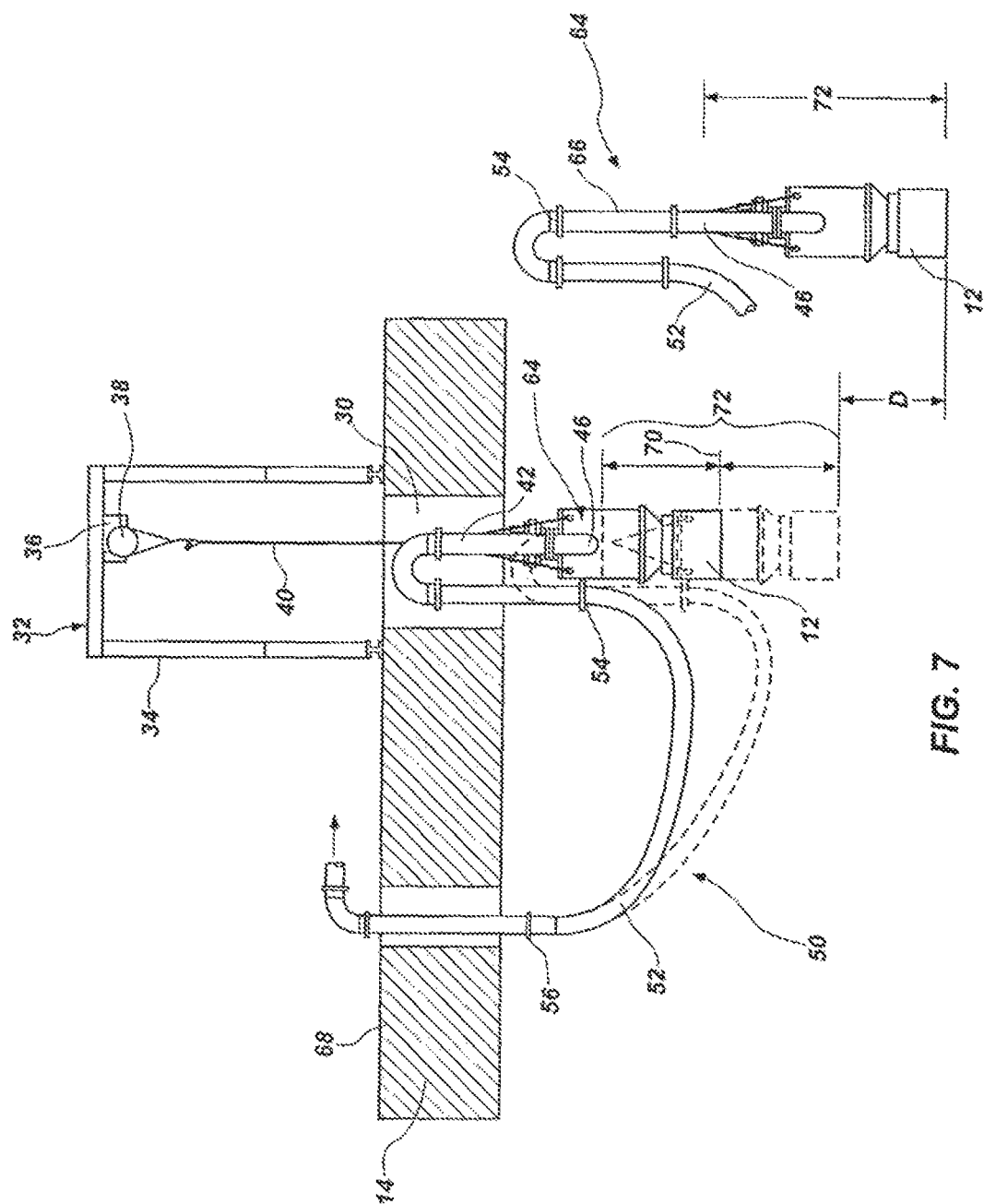
FIG. 7 is a schematic view illustrating the static positioning elements and dynamic positioning elements in accordance with a first aspect of the invention for lowering of a submersible pump to a selected depth.

As best illustrated in FIGS. 6 and 7, each submersible pump 12 is suspended by a hoist cable 40 from the hoist 36.

The submersible pump 12 is typically connected to the hoist cable 40 by a hook device 42. The submersible pump 12 is structured with an inlet 44 which is oriented for positioning in or near the materials at the bottom of the body of fluid that are to be suctioned and removed. The submersible pump 12 is also structured with a discharge outlet 46 having known and conventional means for attaching ancillary piping thereto.

Figure 5:
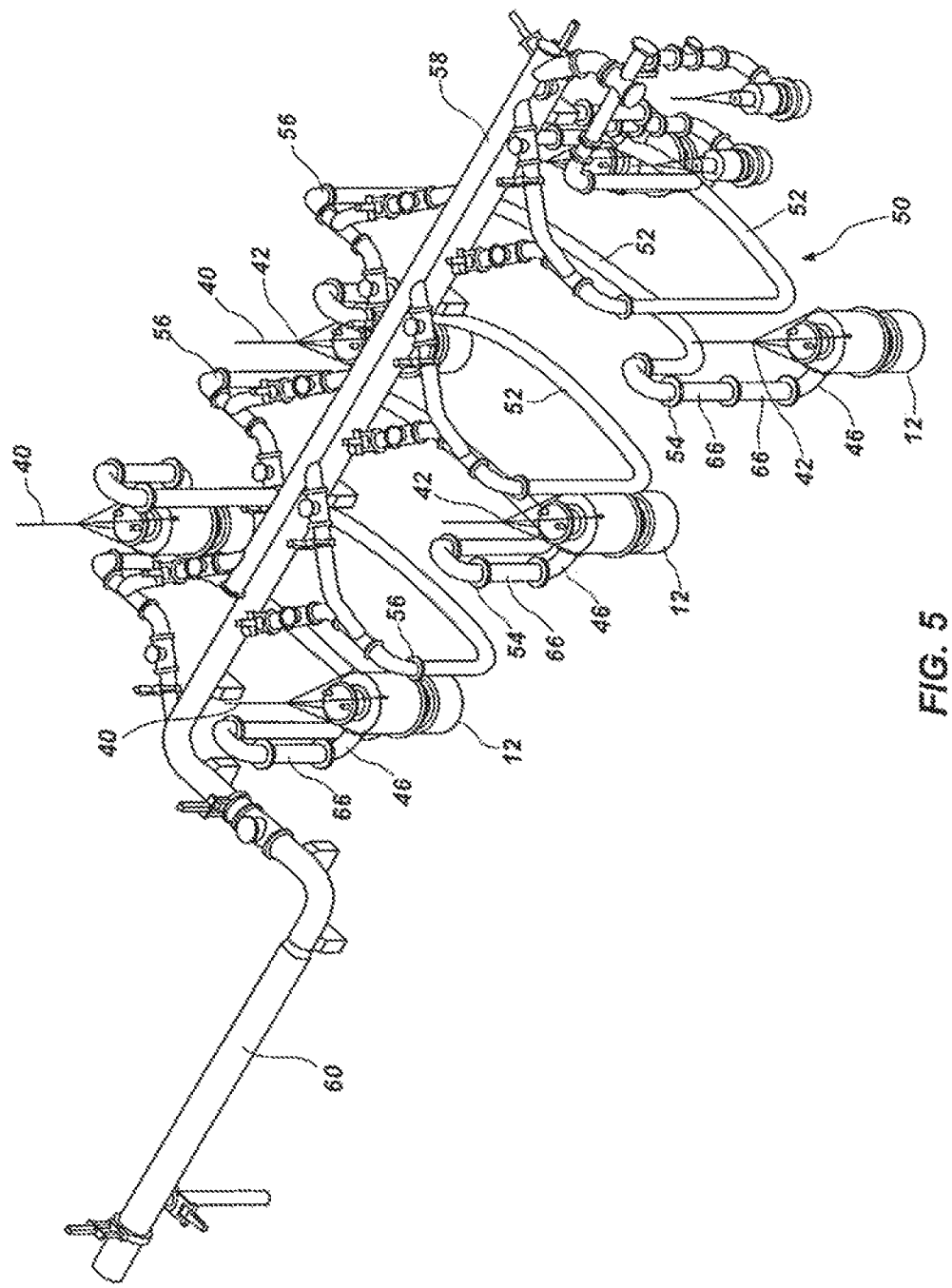
FIG. 5 is an isometric view of a manifold of submersible pumps, where the elements and structures of the flotation barge have been removed for simplification of viewing the pump arrangements.

In accordance with the first aspect of the disclosure, dynamic positioning elements 50 are provided for effecting a dynamic positioning of the submersible pump 12 at a selected depth below the water level or level of the flotation barge 10. In general, the dynamic positioning elements 50 include a flexible conduit 52 having a first end 54 that is attached proximate the discharge outlet 46 of the submersible pump 12 and a second end 56 which may, as illustrated in FIG. 5, be connected to a rigid pipe 58 that leads to a discharge header 60 for deposit of the suctioned slurry away from the flotation barge 10. As described and illustrated below, the second end 56 of the flexible conduit 52 may be directed to a point away from and off of the flotation barge 10 for deposition of the suctioned slurry away from the flotation barge 10.

Figure 3:
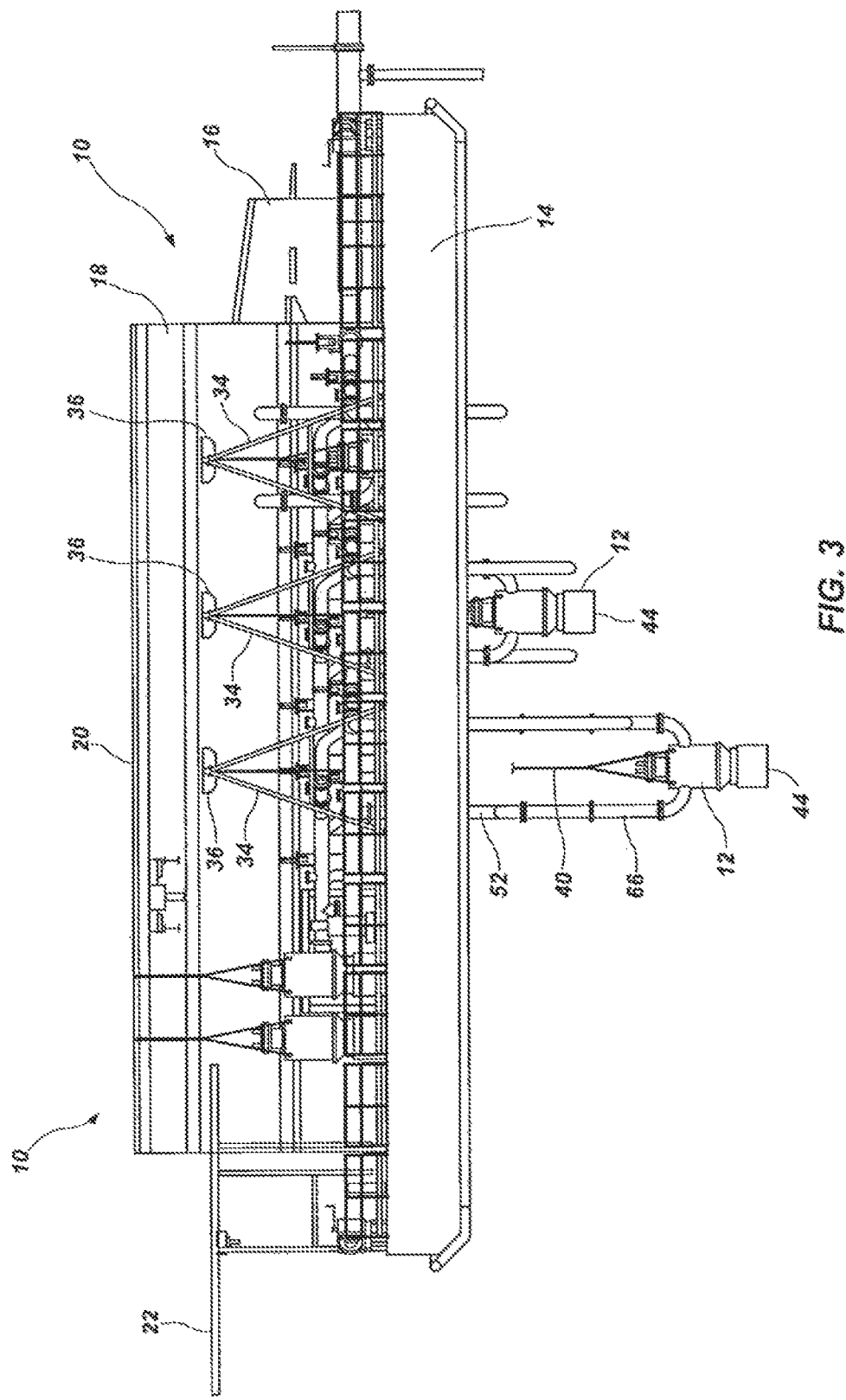
FIG. 3 is a side view in elevation of the flotation barge illustrated in FIG. 1.

The flexible conduit 52 generally passes under the platform 14 of the flotation barge 10, as illustrated in FIGS. 3, 4 and 6, and enables the submersible pump 12 to be lowered below the fluid level. The length of flexible conduit 52 that may be accommodated on the flotation barge 10 is limited, however, and a finite length of flexible conduit 52 is provided in the arrangement. Thus, for example, if the particular pumping or dredging application requires the submersible pump to have the general capacity of operating at twenty meters below the water level, then the flotation barge 10 may be structured and sized to accommodate a flexible conduit 52 of twenty meters in length for each submersible pump 12 that is in operation on the flotation barge 10.

If, however, it is thereafter determined that the pump should be tasked to operate at a greater depth to suction materials that, for example, are in lower stratifications of a tailings pond, then the finite length of the flexible hose 52 presents a concomitant limitation to the increase in the desired operation depth. Therefore, in a further aspect of the present disclosure, static positioning elements 64 are provided for increasing the dynamic range at which the submersible pump 12 may operate.

Figure 8:
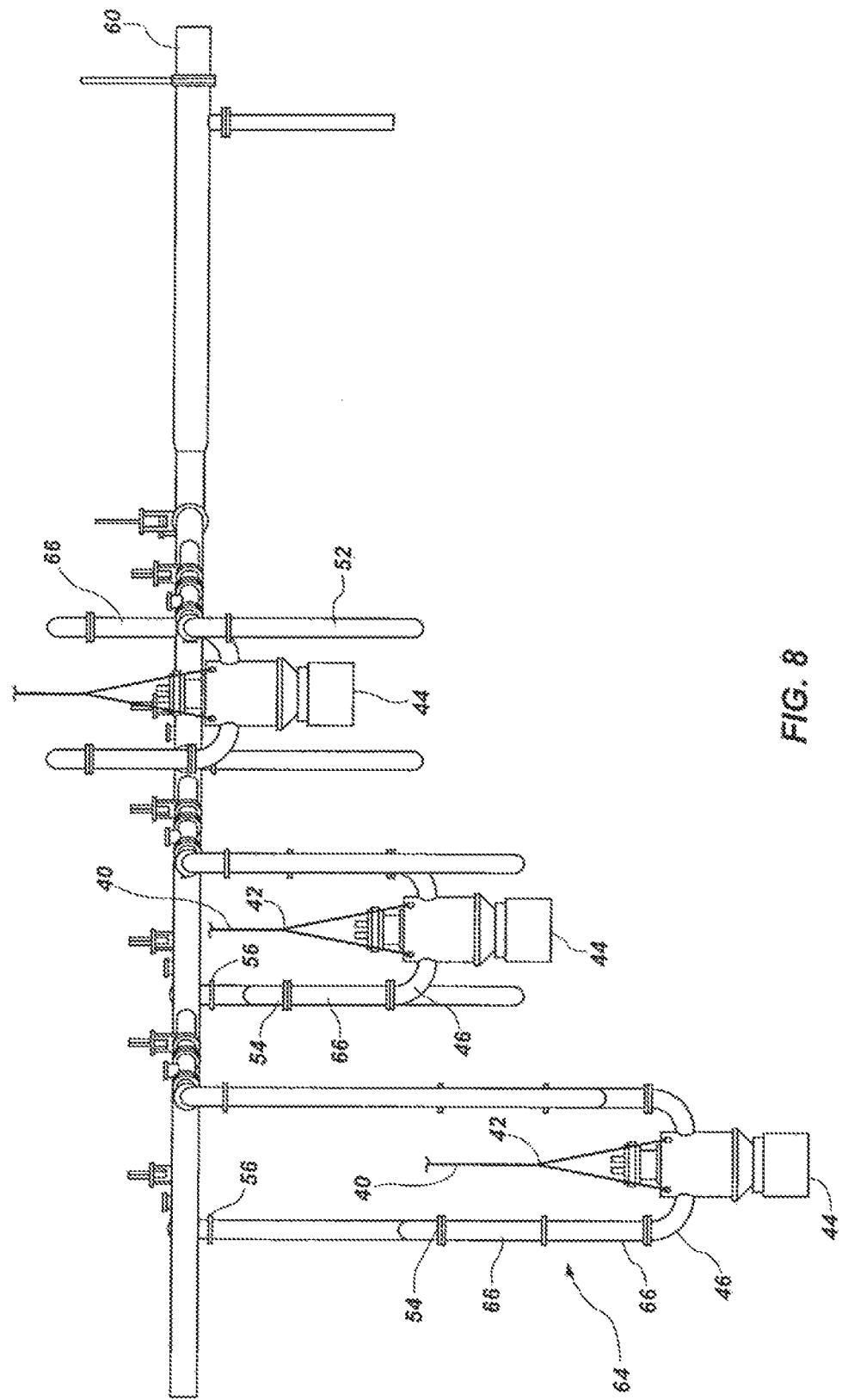
FIG. 8 is a side view in elevation of a plurality of submersible pumps illustrating the variable static adjustments of the submersible pump that may be achieved by use of the static positioning elements and the dynamic positioning elements in accordance with a first aspect of the invention.

As seen in FIGS. 6-8, the static positioning elements 64 generally comprise one or more lengths of pipe spools 66 that can be added to the discharge outlet 46 of the submersible pump 12 to increase the dynamic range at which the submersible pump 12 can operate. Each pipe spool 66 may generally be two meters in length and is adapted for connection to the discharge outlet 46 or to another pipe spool by known methods (e.g., securement together of cooperating flanges on the discharge outlet and the pipe spool by threaded bolts). The first end 54 of the flexible conduit 52 is then connected to the pipe spool 66 by known methods (e.g., securement together of cooperating flanges on the pipe spool and the flexible conduit by threaded bolts).

Attaching the pipe spools 66 to the discharge outlet 46 involves the use of the overhead crane 20 only to handle the pipe spool 60 inserts. The submersible pump 12 is raised by the hoist device 36 of the dynamic suspension system 32 to a position partially above the deck 68 of the platform 14. This provides access to the discharge pipe 46. Prior to connection of the flexible conduit 52 to the discharge pipe 46 or inserted pipe spool 66, the flexible conduit 52 may be secured by a portable clamp (not shown) which prevents the flexible conduit 52 from moving or falling through the opening 30 in the platform 14. The pipe spool 66 is connected to the discharge outlet 46 by known methods, the submersible pump 12 is then lowered approximately two meters to provide access to the opposing end of the pipe spool 66, and the flexible conduit 52 is connected to the pipe spool 66 by known methods.

In adding additional pipe spools 66, the submersible pump 12 is raised by the hoist device 36 to a level that provides access to the point of connection of the flexible conduit 52 to the existing pipe spool 52 and the flexible conduit 52 is disconnected from the existing pipe spool. The pump 12 is then lowered by the hoist device 36, thus creating space for the insertion (or removal) of a pipe spool 66 insert, and connection of the flexible conduit 52 to the inserted pipe spool 66 is completed. The pump can then be raised, the flange connections re-secured and the clamp removed from the flexible conduit 52, and the pump can then be returned to service. The relative depths achieved by static repositioning of the submersible pumps 12 are generally depicted in FIG. 8.

Use of the static positioning elements 64 as described above provides a means for statically modifying the nominal depth to which the submersible pump 12 can be lowered, and over which the dynamic range of the submersible pump 12 can operate. That is, the submersible pump 12 is established to have a selected range of depth, or dynamic range, to which the pump 12 can be lowered with the existing piping arrangement. As used herein, "nominal depth" refers to the center of the dynamic range at which the submersible pump 12 is established to operate. Changing the nominal depth, therefore, involves changing the relationship between the discharge outlet 46 of the submersible pump 12 and the first end 54 of the flexible conduit 52. By inserting lengths of pipe spool 66 between the discharge outlet 46 and the first end 54 of the flexible conduit 52, as previously described, that relationship, and thus the nominal depth, can be modified to provide greater depths at which the pump can be placed while the flexible conduit 52 configuration remains unchanged.

For example, as illustrated in FIG. 7, if the submersible pump 12 and flexible conduit 52 arrangement are currently positioned to operate at a nominal depth 70 of five meters, the submersible pump 12 would have a dynamic extended range 72 of from three to seven meters. By inserting a two meter pipe spool 66 between the discharge outlet 46 and the first end 54 of the flexible conduit 52, the pump dynamic range 72 will change from five to seven meters, or by an increased operating depth, indicated at D. However, the flexible conduit 52 configuration will remain as before. This operation is repeatable for various nominal depths, During such an operation the calibration of the dynamic positioning control is unchanged, since the relationship between the submersible pump 12 and the hoist hook 42 is constant. Because the relationship between the hook 42 and the submersible pump 12 remains constant, the elevation of the submersible pump 12 can be accurately monitored. The total travel of the hoist cable 40 is designed to accommodate the full range of movement of the submersible pump 12 without the need to detach the pump 12 from the hoist hook 42. The range of movement will cover both the dynamic motion (e.g., +/−two meters) and also any additional movement resulting from static repositioning (e.g., two meter increments) due to additional lengths of pipe spool 66. With the hoist being constantly coupled to the pump, it is not necessary to recalibrate the pump positioning control system should a static adjustment be made. In the event that the position of the pump is lost by the control system, recalibration is a simple matter of raising the hoist/pump to the hoist high-limit switch, thus causing a recalibration of the pump position control to "zero", Notably, each hoist device 36 may be equipped with a failsafe mechanical full-load brake. It should be noted that simultaneous operation of both the pump and the pump positioning system is an important consideration. For this reason, the pump positioning VFD's may, in one suitable aspect, be located remotely from the flotation barge 10 in, for example, an on-shore (i.e., off-barge) electrical control room. Alternatively, operation of the pumps may be controlled from the control room 16 on the flotation barge 10.

Referring again to the dynamic positioning elements 50 shown in FIGS. 1-8, it should be noted that the distance between the first end 54 and the second end 56 of the flexible conduit 52 produces a free bend radius significantly greater than a minimum bend-radius of the flexible conduit 52, thus preventing kinking of the flexible conduit 52. The flexible conduit 52 length is such that the pump is free to move through a dynamic range greater than +/−two meters. A steel wire threading cable 76, as depicted in FIG. 6, is permanently installed in each pump location and follows the path of the flexible conduit 52 to the pump 12. The threading cable 76 is secured to the flexible conduit 52 and also to the platform 14. The threading cable 76 is also secured to the pump discharge outlet 46. The threading cable 76 is used to recover the flexible conduit 52 in the event of a system failure, and to assist in re-threading a new flexible conduit 52 in the event that replacement or repair is required.

Figure 9:
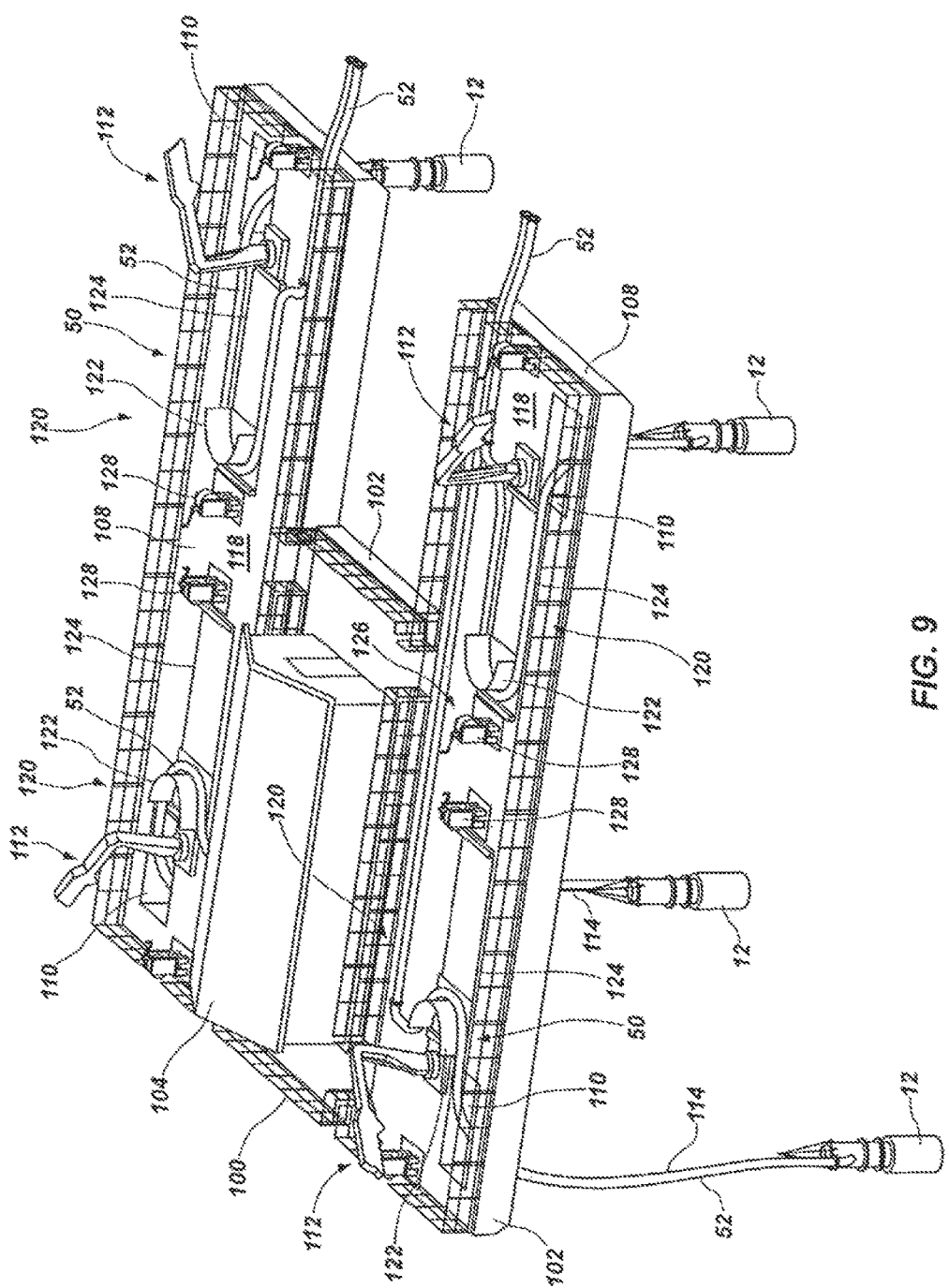
FIG. 9 is an isometric view of an alternative embodiment of a flotation barge suitably structured for supporting the dynamic positioning elements of the first aspect of the disclosure.
Figure 10:
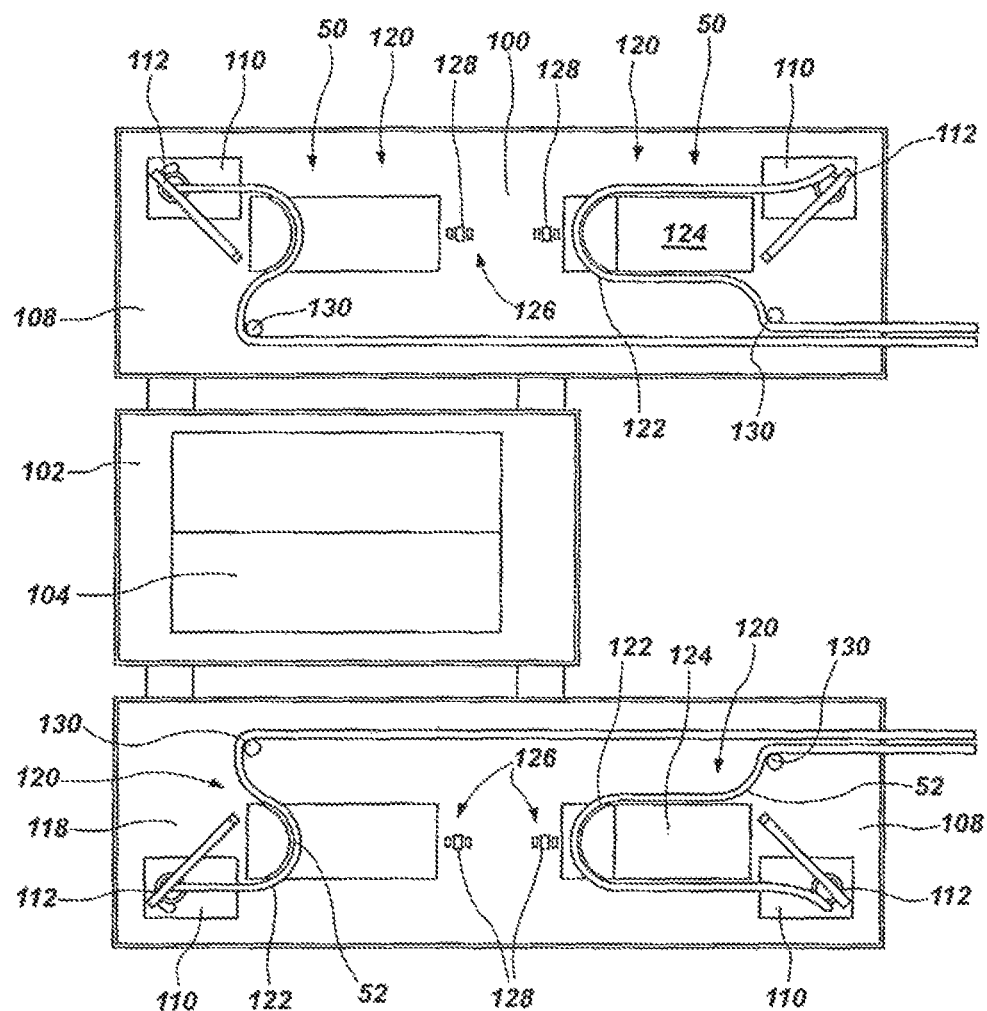
FIG. 10 is a plan view of the flotation barge illustrated in FIG. 9.
Figure 11:
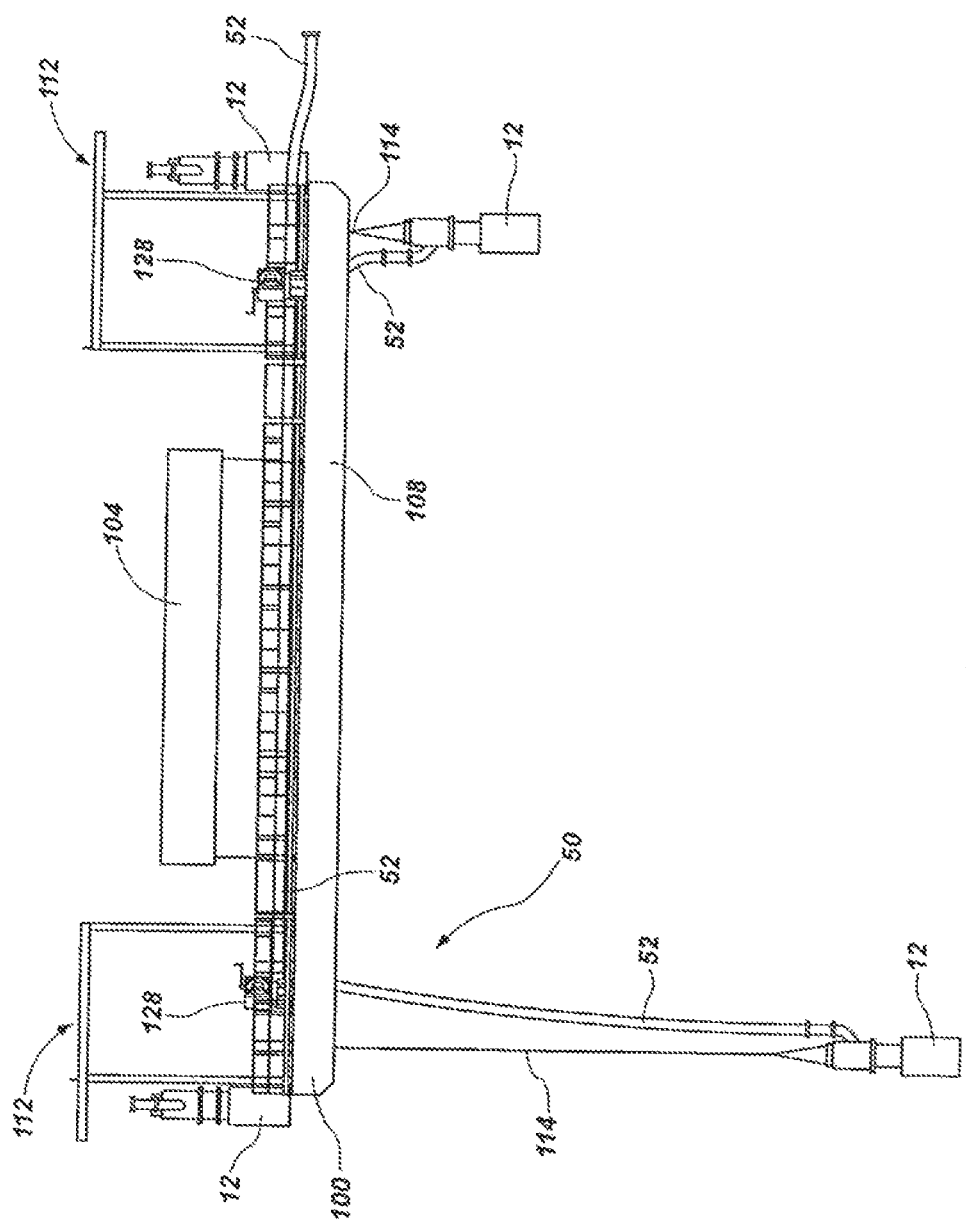
FIG. 11 is a side view in elevation of the pontoon illustrated in FIG. 9.

FIGS. 9-11 depict an alternative embodiment of a flotation barge 100 that is also suitably adapted to support at least one submersible pump 12 for lowering the submersible pump 12 to a selected depth using static positioning elements and dynamic positioning elements as previously described. The flotation barge 100 generally comprises a central platform 102 which is structured and sized to support a housing 104 thereon. The housing 104 generally provides cover for operations equipment, such as control devices and mechanical systems, and may provide housing for personnel in certain applications. The housing 104 may vary is structure and size from that which is shown in FIGS. 9-11.

The barge 100 further comprises one or more pontoons 108 that are positioned on either side of the central platform 102. As depicted in FIG. 1, the barge 100 may be configured with two pontoons 108. The pontoons 108 are each structured to support at least one submersible pump 12 in a manner that allows the submersible pump 12 to be raised and lowered a selective distance from the pontoon 108, as previously described herein. Specifically, each pontoon 108 is configured with an opening 110 through which a submersible pump 12 is positionable, as best seen in FIGS. 9 and 10.

At least one submersible pump 12 is secured to each pontoon 108. Each submersible pump 12 is secured to the pontoon 108 in a manner which enables the submersible pump 12 to be raised and lowered relative to the pontoon 108.

By way of example only, a hoist mechanism 112 may be positioned relative to the opening 110 and is positioned to enable raising and lowering of the pump 12. The hoist mechanism 112 may be structured with means for housing or providing mechanical hoisting means, such as a motor. The hoist mechanism 112 may suitably provide supporting structure for accommodating a hoisting cable 114 for raising and lowering the submersible pump 12, and may also provide support means for accommodating power cabling (not shown) for the submersible pump 12 to provide power to the pump motor (not shown) in known fashion.

Selective movement of each submersible pump 12 is accomplished, at least in part, by employing static positioning elements and dynamic positioning elements 50 as previously described. Accordingly, as illustrated in FIGS. 9-12, the discharge outlet 46 of each submersible pump 12 may be connected to a flexible conduit 52 in the manner previously described. The flexible conduit 52 passes under the pontoon 108, and the greater length of the flexible conduit 52 resides below the pontoon 108 when the pump is in operation at the bottom of the body of water.

The flexible conduit 52 of the flotation barge 10, 110, while providing the ability to selectively lower the submersible pump 12 to a desired depth, presents potential problems that result in a particular innovation in this arrangement. Particularly, the flexible conduit 52 may be subject to kinking or bending and may become entangled in the pump, or may become entangled in matter that resides in a body of water, or may become entangled with other flexible conduits 52 of adjacent pumps. Additionally, the freezing conditions of wintertime can cause the material in the flexible conduit 52, such as mature fine tailings (MFT) suctioned from a tailings pond, to freeze in the flexible conduit 52, which can cause the flexible conduit to bend, kink or rupture. The innovative mechanism of the invention overcomes this problem by controlling the maintenance and maneuverability of the flexible conduit 52.

Thus, in a second aspect of the present disclosure, a take-up mechanism 120 is provided for addressing the problems encountered with maintaining the flexible conduit 52. FIGS. 9-13 depict an alternative embodiment of the barge 100, and depict a take-up mechanism 120 which enables the flexible conduit 52 to be raised to the top of the barge 100. This is particularly advantageous in winter conditions to enable the flexible conduit 52 to be removed from the freezing water. Further, the ability to hoist the flexible conduit 52 to the top of the barge 100 also provides advantageous storage of the flexible conduit 52. The take-up mechanism 120 also permits selective pay-out of the flexible conduit 52 in conditions where, for example, the pump 12 is positioned to operate at a depth somewhere between the bottom of the barge 10 and the bottom of the body of water.

In a first embodiment of the take-up mechanism 120 of the present disclosure, the take-up mechanism 120 includes a curved hose bib 122 that is slidingly received on or relative to the deck 118 of the pontoon 108. In one suitable arrangement as shown in FIGS. 9 and 10, a track 124 may be provided on which the hose bib 122 is slidingly received, thereby enabling the hose bib 122 to move from a point near the hoist mechanism 112 to a point distanced from the hoist mechanism 112. The hose bib 122 is caused to move back and forth on the track 124 by a movement-producing device 126, such as a winch 128. The relative positioning of the flexible conduit 52 and submersible pump 12 below the barge 100 resulting from a particular position of the curved hose bib 122 is demonstrated in FIG. 11.

The lateral movement of the hose bib 122 along the track 124 feeds out (also referred to as "pays out") and takes in the flexible conduit 52 a selected amount to enable precise dynamic positioning of the flexible pump 12 at a desired depth. The curvature of the hose bib 122 is selected to maintain the required radius of curvature of the flexible conduit 52 to thereby prevent kinking in the flexible conduit 52. For example, a 12-inch conduit or hose requires a six foot radius of curvature to avoid bending or kinking. Thus, the curvature of the hose bib 122 may be selected to provide the radius required to prevent kinking in a given diameter of conduit, and may preferably have a six foot radius of curvature which will accommodate twelve inch diameter conduits and those of lesser diameter dimension.

In addition to the curved hose bib 122, the flexible conduit 52 may be guided in its movement along the deck 118 of the barge 100 by being directed about one or more guides 130 that are secured to the deck 118 of the barge 100. The guides may, in one embodiment, be rotatable about a central axis to enhance the guiding of the flexible conduit 52 about the guide 130.

The depicted arrangement allows the flexible conduit 52 to be fed out a sufficient distance to allow free flotation of the flexible conduit 52 on the surface of the water, and also allows the flexible conduit 52 to be taken in for storage on the deck of the barge 100. While a single hose bib 122 is shown associated with each submersible pump 12, a series of spaced-apart hose bibs 122 may be arranged and employed to loop the flexible conduit 52 in an S-looped or similar arrangement on the deck 118 of the barge 110 or pontoon 108 in order to accommodate greater lengths of flexible conduit 52.

Particular advantages of the take-up mechanism 120 of the invention shown in FIGS. 9-11 include the ability to take up and maintain the flexible conduit 52 in a horizontal orientation on the barge 100, which assists in preventing bending or kinking. The curved hose bib 122 is also structured to receive a single section of flexible conduit 52, also referred to herein as a "single feed" arrangement, which further prevents tangling of the conduit upon itself or crushing of one section of flexible conduit 52 by another section of the flexible conduit 52, as is experienced with use of rotary drum reel devices that take up a continuous length or section of conduit on a spool-type reel with the result that the reeled-in conduit can wind on top of itself.

Additionally, the sliding movement of the hose bib 122 may be controlled on board (i.e., on the barge) or may be controlled remotely, which is not available when using rotary drum reel devices that require manned operational supervision. Further, the curved hose bib 122 can accommodate a varied number of flexible conduits of differing diameters, which is not possible with spool-type reels since the large size of the reel prevents exchanging the reel for a differently diametered reel to suit flexible conduits of various diameters. The horizontal and low-profile arrangement of the take-up mechanism 120 also preserves the limited space that is available on a barge 100 and enables the manipulation and compact handling of flexible conduits 52 associated with multiple numbers of pumps 12, whereas use of a spool-type reel enables the use of only a single reel given the very large size of the spool.

Figure 12:
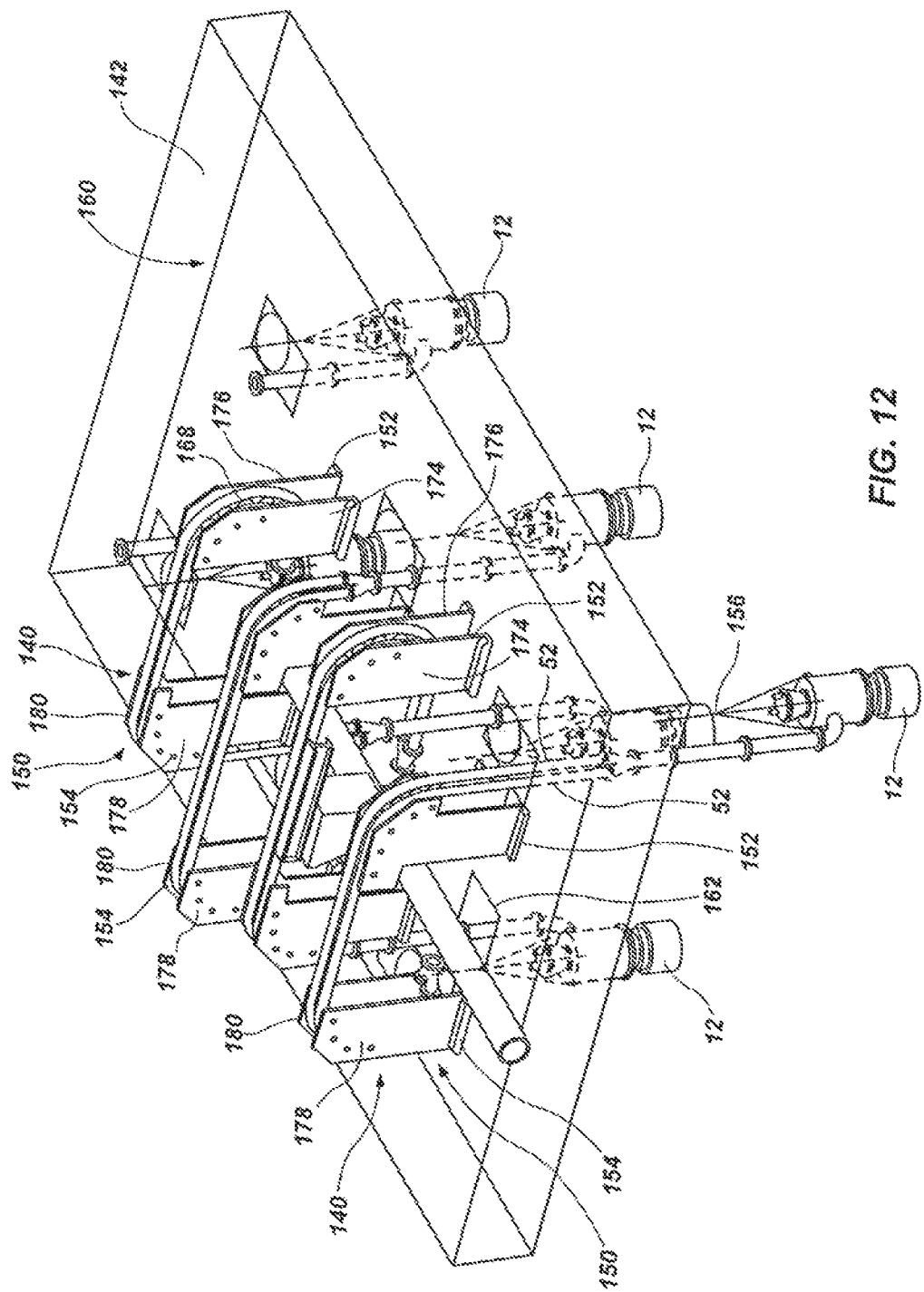
FIG. 12 is an isometric view of an alternative embodiment of the dynamic positioning elements of the invention.
Figure 13:
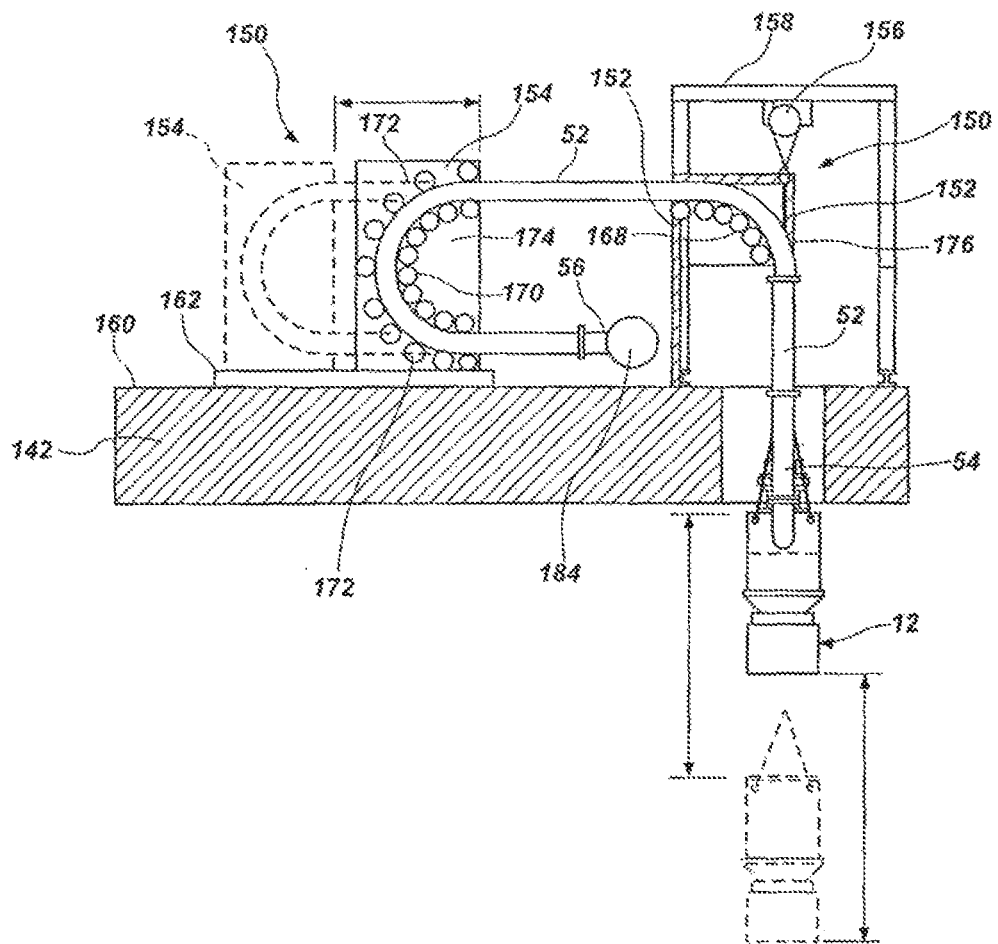
FIG. 13 is a schematic view of the operational aspects of the dynamic positioning elements illustrated in FIG. 12.

A further embodiment of a take-up mechanism is illustrated in FIGS. 12 and 13, which depict a vertical take-up mechanism 140 for taking in the flexible conduit 52 associated with a submersible pump 12 on a barge 100. FIG. 12 illustrates a section of a platform 142 of a flotation barge and schematically illustrates the positioning of a plurality of submersible pumps 12 in relation to the platform 142 and a corresponding plurality of vertical take-up mechanisms 140, one associated with each single submersible pump 12. It should be noted that while not expressly depicted in FIG. 12, each of the submersible pumps 12 is suspended from a dynamic suspension system that is capable of hoisting the submersible pump 12 toward and away from the platform 142 in a manner similar to the embodiments and arrangements described and illustrated with respect to FIGS. 1-11.

The hoisting mechanisms are not shown in FIG. 12 for the sake of clearly illustrating the take-up mechanism 140 of the present embodiment.

In the embodiment of FIGS. 12 and 13, the vertical take-up mechanism 140 comprises a vertical rack assembly 150 having two spaced apart stanchions 152, 154 that are structured to be movable relative to each other. In one particularly suitable arrangement, as depicted more clearly in FIG. 13, the stanchion 152 that is located closest to the hoisting mechanism 156 and pump support member 158 for raising and lowering the submersible pump 12 may be stationarily secured to the deck 160 of the platform 142, while the stanchion 154 that is distanced from the hoisting mechanism 156 is slidably movable along the deck 160, such as by being connected to the deck 160 by means of a track 162 or other suitable device for effecting movement.

The stationary stanchion 152 may be structured with a series of adjacently-positioned rollers 168 that are arranged in a curved quadrant configuration that provides a selected radius of curvature. The flexible conduit 52, extending from the discharge outlet 46 of the submersible pump 12 and up through the platform 142, is trained over the curved quadrant of rollers 168 of the stationary stanchion 152. The movable stanchion 154 likewise may be structured with a series of adjacently-positioned rollers that are arranged in a semi-circular array of rollers 170, and two such semi-circular arrays of rollers 170, 172 may be arranged in spaced apart arrangement to provide a channel 174 through which the flexible conduits 52 is trained. The arrays of rollers 170, 172 are configured with a curvature that maintains the appropriate radius of curvature for the given diameter of flexible conduit 52 (e.g., six feet), As best understood from FIG. 12, the stationary stanchion 152 may further comprise a pair of spaced apart walls 174, 176 between which the quadrant of rollers 168 is journalled. Likewise, the movable stanchion 154 may comprise a pair of spaced apart walls 178, 180 between which the semi-circular arrays of rollers 170, 172 are journalled. It may be noted further that the distance between the walls 174, 176 of the stationary stanchion 152 and the walls 178, 180 of the movable stanchion 154 may be sufficient to enable either one or two flexible conduits to be trained over the roller arrays.

Again, as might be better understood from FIG. 13, when the submersible pump 12 is to be raised, the movably stanchion 154 is urged to move along the track 162 in a direction away from the stationary stanchion 152 which enables the flexible conduit 52 to be drawn up by the vertical take-up mechanism 140. Conversely, movement of the movable stanchion 154 toward the stationary stanchion 152 causes the flexible conduit 52 to be fed out, thereby allowing the pump 12 to be lowered relative to the platform 142. The second end 56 of the flexible conduit 52 may be connected to a charge header pipe 184 that directs the suctioned slurry away from the platform 142.

The vertical take-up mechanism, in another aspect of the invention, may comprise a single upright member or stanchion that is slidably secured to a track member secured to the deck of the platform. In like manner, the slidable movement of the single upright member toward and away from the hoisting mechanism, in a manner similar to the curved hose bib 122 of FIG. 9, will provide a taking up and feeding out of the flexible conduit.

It should also be noted that the barge arrangements and take-up mechanisms illustrated in FIGS. 19-13 also provide the means for enabling the dynamic depth range of the submersible pump to be statically repositioned by the static positioning elements described previously herein.

The mechanisms described and illustrated herein are adaptable to many types and sizes of flotation vessels and barges, and are adaptable to various types of dredging elements other than submersible pumps. Therefore, reference herein to specific elements, mechanisms, functions, constructions or configurations are by way of example only and not by way of limitation.

What is claimed is:

1. An apparatus for positioning a flexible conduit, the apparatus comprising:
    a track, one end of the track disposed near an opening in a deck through which the flexible conduit is to extend;
    a curved hose bib shaped to receive the flexible conduit, the curved hose bib slidingly coupled to the track enabling the curved hose bib to move between a point near the opening and a point distanced from the opening; and
    a movement-producing device connected to the curved hose bib, the movement-producing device configured to move the curved hose bib towards the point near the opening to pay out the flexible conduit through the opening, the movement-producing device configured to move the curved hose bib towards the point distanced from the opening to take up the flexible conduit from the opening;
    the movement-producing device operable in conjunction with a hoist that raises and lowers the flexible conduit through the opening.

2. The apparatus of claim 1, wherein the curved hose bib is shaped to receive a single section of the flexible conduit.

3. The apparatus of claim 1, wherein the curved hose bib is shaped to accommodate a varied number of different flexible conduits of differing diameters.

4. The apparatus of claim 1, wherein the curvature of the curved hose bib is selected to maintain a radius of curvature for the flexible conduit to prevent kinking in the flexible conduit.

5. The apparatus of claim 1, wherein the deck is horizontally oriented and the movement-producing device is configured to move the curved hose bib horizontally with respect to the deck.

6. The apparatus of claim 5, wherein the curved hose bib is oriented horizontally with respect to the horizontally oriented deck.

7. The apparatus of claim 5, wherein the curved hose bib is oriented vertically with respect to the horizontally oriented deck.

8. The apparatus of claim 1, wherein movement-producing device comprises a winch.

9. The apparatus of claim 1, further comprising one or more guides secured with respect to the deck, the one or more guides positioned to guide the flexible conduit towards the curved hose bib.

10. A method of positioning a flexible conduit, the method comprising:
    providing a track, one end of the track disposed near an opening in a deck through which the flexible conduit is to extend;
    providing a curved hose bib shaped to receive the flexible conduit, the curved hose bib slidingly coupled to the track enabling the curved hose bib to move between a point near the opening and a point distanced from the opening; and
    providing a movement-producing device connected to the curved hose bib, the movement-producing device configured to move the curved hose bib towards the point near the opening to pay out the flexible conduit through the opening, the movement-producing device configured to move the curved hose bib towards the point distanced from the opening to take up the flexible conduit from the opening; and
    controlling the movement-producing device in conjunction with operation of a hoist that raises and lowers the flexible conduit through the opening, such that the curved hose bib moves towards the point near the opening to pay out the flexible conduit through the opening when the hoist lowers the flexible conduit through the opening, and such that the curved hose bib moves towards the point distanced from the opening to take up the flexible conduit from the opening when the hoist raises the flexible conduit through the opening.

11. The method of claim 10, further comprising the curved hose bib receiving a single section of the flexible conduit.

12. The method of claim 10, wherein the curved hose bib is shaped to accommodate a varied number of different flexible conduits of differing diameters.

13. The method of claim 10, further comprising the curvature of the curved hose bib maintaining a radius of curvature for the flexible conduit to prevent kinking in the flexible conduit.

14. The method of claim 10, wherein the deck is horizontally oriented, the method further comprising the movement-producing device moving the curved hose bib horizontally with respect to the deck.

15. The method of claim 14, wherein the curved hose bib is oriented horizontally with respect to the horizontally oriented deck.

16. The method of claim 14, wherein the curved hose bib is oriented vertically with respect to the horizontally oriented deck.

17. The method of claim 10, wherein movement-producing device comprises a winch.

18. The method of claim 10, further comprising guiding the flexible conduit towards the curved hose bib using one or more guides secured with respect to the deck.

* * * * *